June 1, 1954  K. A. SCHMULDT  2,679,824
ARTICLE COATING APPARATUS
Filed July 19, 1951  4 Sheets-Sheet 1

INVENTOR
K. A. SCHMULDT
BY
ATTORNEY

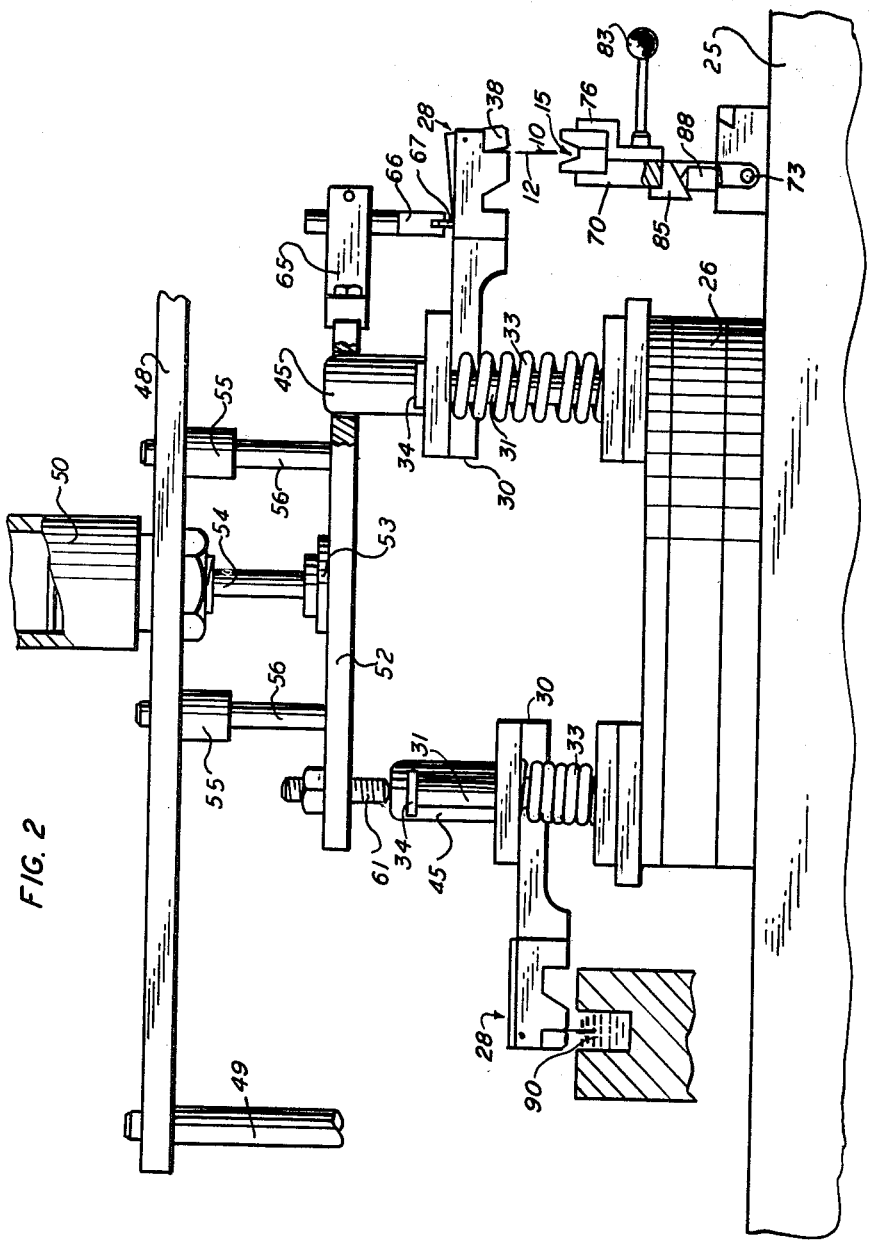

June 1, 1954 K. A. SCHMULDT 2,679,824
ARTICLE COATING APPARATUS
Filed July 19, 1951 4 Sheets-Sheet 3
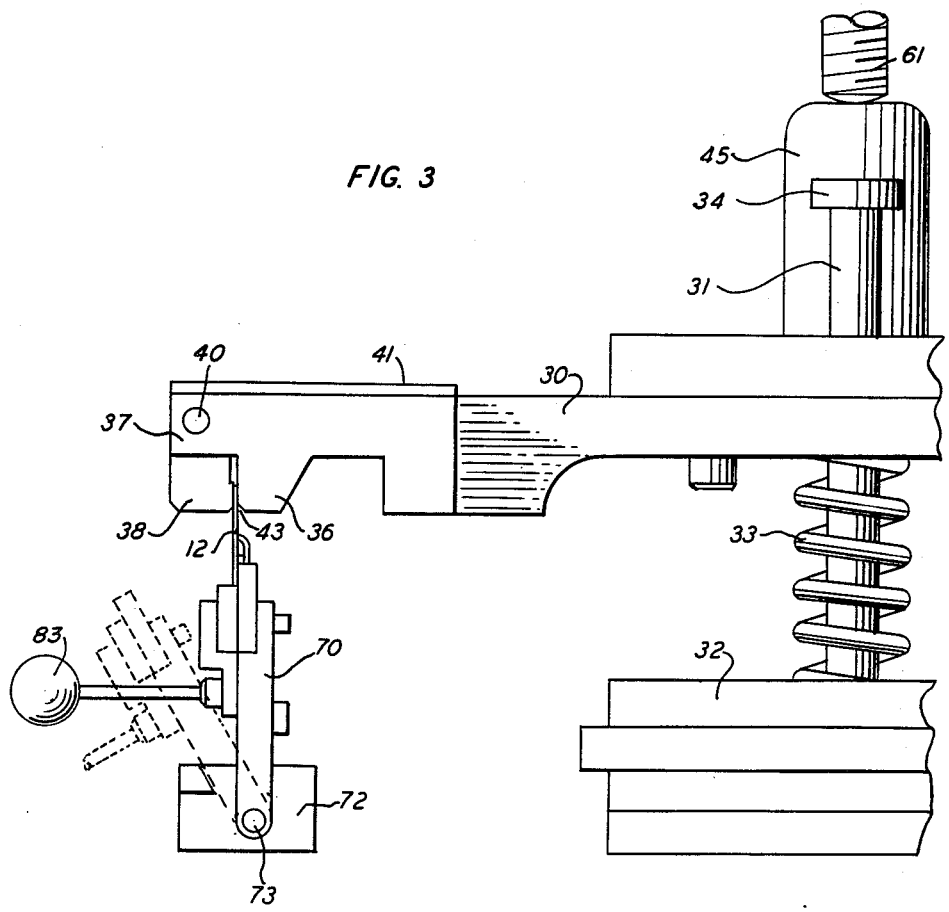
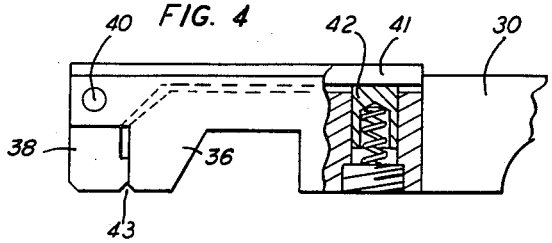
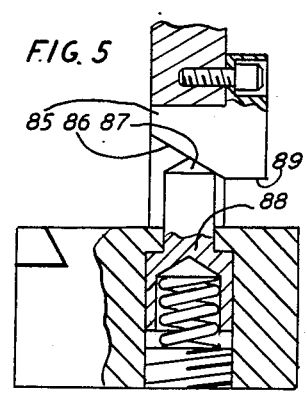
INVENTOR
K. A. SCHMULDT
BY
ATTORNEY June 1, 1954
K. A. SCHMULDT
2,679,824
ARTICLE COATING APPARATUS
Filed July 19, 1951
4 Sheets-Sheet 4
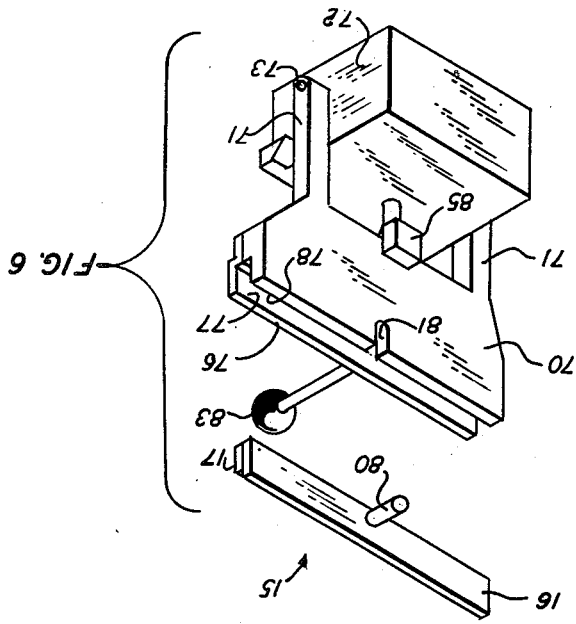
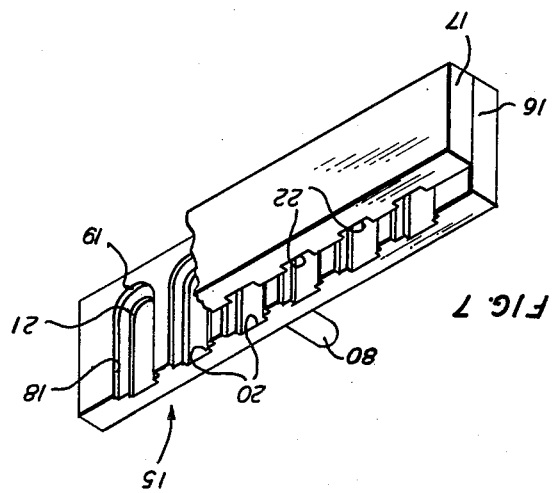
INVENTOR
K. A. SCHMULDT
BY
ATTORNEY Patented June 1, 1954

2,679,824

UNITED STATES PATENT OFFICE 2,679,824

ARTICLE COATING APPARATUS

Karl A. Schmuldt, Emmaus, Pa., assignor to Western Electric Company, Incorporated, New York, N. Y., a corporation of New York Application July 19, 1951, Serial No. 237,583

2 Claims. (Cl. 118—425)

This invention relates to apparatus for coating articles and more particularly to apparatus for soldering terminals to "varistor" (i. e. variable resistor) discs.

In the present embodiment of the invention the article to be coated is a silicon carbide disc having opposing faces coated with copper, and a part initially having the appearance of a paper clip to straddle the disc and engage the copper coated surfaces thereof. The part assimilating a paper clip is to have its leg portions soldered to the copper coated surfaces of the disc after which the outer connecting portion of the element will be removed, leaving parallel terminals connected by solder to the opposing faces of the disc.

An object of the present invention is to provide an apparatus which is simple in structure yet highly efficient in coating articles, particularly terminal-like elements, to silicon carbide varistor discs.

With this and other objects in view the invention comprises an apparatus for coating articles including a holder to receive an article and a unit operable to grip the article and movable to move the article into and out of a coating bath.

More specifically, the apparatus includes an intermittently movable turret having three sets of gripping units movable relative to a loading position, a flux bath, a solder bath and an unloading position. The holders are provided with individual compartments to receive a series of the parts forming the article, namely, the silicon carbide discs and to accurately locate and guide the other or terminal parts to cause accurate assembly of the parts prior to the holder being placed in the apparatus. A supporting unit is disposed at the loading position and at the unloading position to receive a loaded holder at the loading position and an empty holder at the unloading position into which the coated articles will be dropped. During a cycle of operation the assembled parts of the articles will be individually gripped by the series of gripping elements in one gripping unit, removed from the holder, and at predetermined intervals during intermittent movement of the turret these articles will be successively dipped into the flux bath and into the solder bath after which they will be released simultaneously at the unloading position to drop into their respective compartments in the empty holder.

Other objects and advantages will be apparent from the following detailed description when considered in conjunction with the accompanying drawings wherein:

Fig. 2 is a vertical sectional view taken along the line 2—2 of Fig. 1;

Fig. 3 is an enlarged fragmentary sectional view taken along the line 3—3 of Fig. 1;

Fig. 4 is a fragmentary detailed sectional view taken along the line 4—4 of Fig. 1, illustrating the gripping jaws;

Fig. 5 is a vertical sectional view of one of the supports at the loading or unloading position; taken, for example, along the line 5—5 of Fig. 1.

Fig. 6 is an isometric view of one of the supports with the holder about to be placed therein;

Fig. 7 is an isometric view of the holder, a portion thereof being broken away; and Fig. 8 is an isometric view of the assembled parts of the article to be coated.

Figure 1:
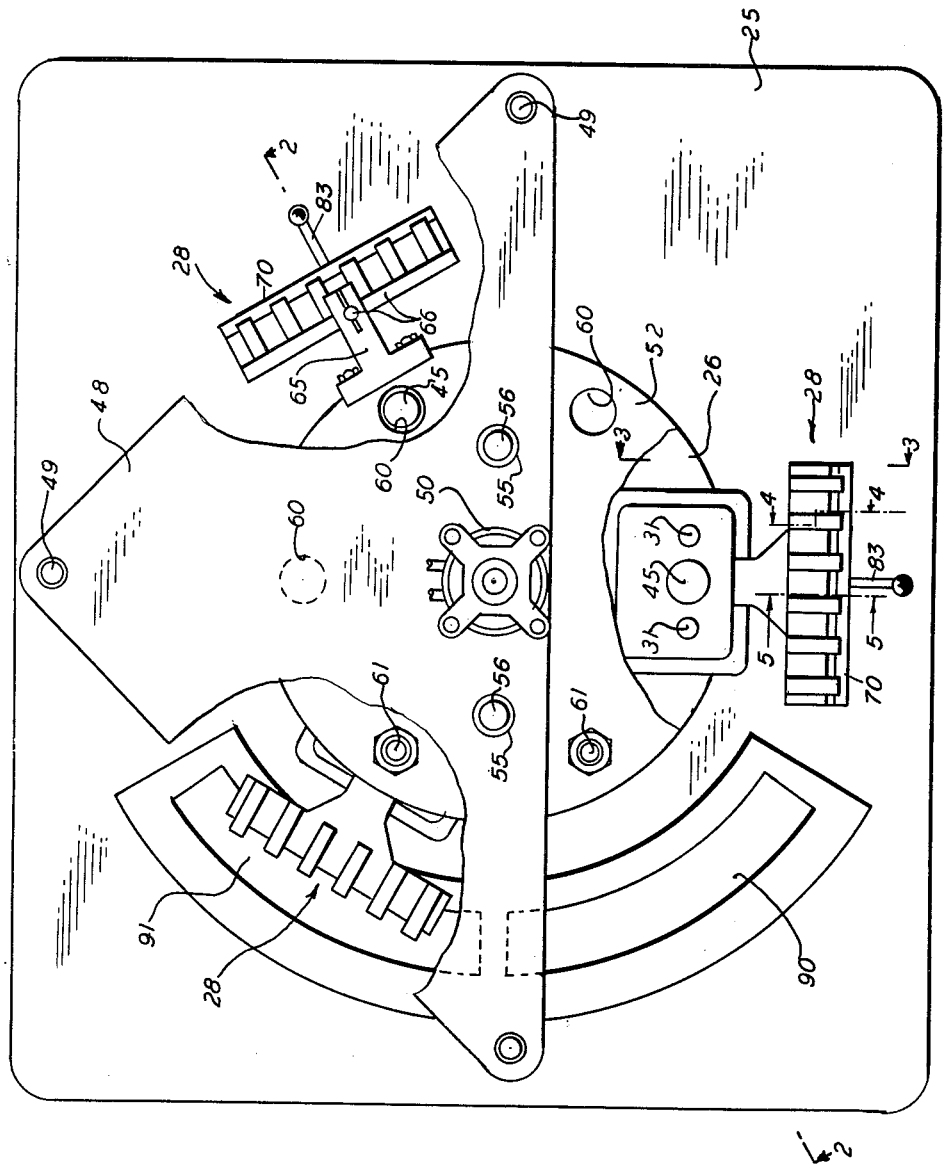
Fig. 1 is a top plan view of the apparatus.

Referring now to the drawings, attention is first directed to Fig. 8 which illustrates the article to be coated. In the present embodiment of the invention the article is composed of a silicon carbide disc 10, having its faces provided with coatings 11 of copper, and a resilient element 12 of the contour shown, having its leg portions with U-shaped lower ends 14 engaging the copper surfaces of the disc.

A suitable number of holders indicated generally at 15 is to be provided for the apparatus. The holder as shown in Fig. 7 is composed of members 16 and 17 which are similar in structure with the exception of their widths, this variation assisting in the assembly of parts of the articles. The inner surfaces of the member 16 has a series of recesses 18 with rounded lower ends 19 to receive the discs 10. Other recesses 20 with rounded lower ends 21 in the member 16 and like recesses 22 in the member 17 receive and guide the resilient elements 12 in place so that they will straddle their respective discs 10.

The apparatus includes a base 25 supporting a turret 26 driven intermittently about its vertical axis with six rest intervals during each complete cycle. Three gripping units 28 are mounted at equally spaced positions about the turret. These units are identical in structure and a description of one will apply to the other two. Considering now the detailed structure of a gripping unit it will be apparent that a bracket-like member 30 is apertured at spaced positions to receive vertically extending guide pins 31 mounted in supporting blocks 32 on the turret 26, springs 33 disposed concentric with the pins 31 normally holding the supporting bracket 30 into its uppermost position, as shown at the right of Fig. 1, against the heads 34 of the pins 31. The bracket 30 has a fixed jaw 36 and bifurcated portions 37 to receive movable jaws 38. The movable jaws are mounted on a pivot rod 40 and have portions 41 which extend inwardly like distances where they are engaged by spring-pressed plungers 42 mounted in the bracket 30 and adapted to urge the movable jaws toward their fixed jaws for gripping engagement with the articles. It will be noted that the jaws are tapered at 43 and spaced comparable to the spacing of the recesses in the holders 15 so that they may be moved downwardly over the article or elements 12 thereof and from gripping engagement therewith when each gripping unit is lowered at the loading position. A member 45 mounted on the bracket 30 between the guide pins 31 is positioned to be engaged by operating means at the loading and coating positions as hereinafter described.

The operating means includes a triangular table 48 mounted at a fixed position on vertical posts 49 supported by the base 25 and carrying an air cylinder 50 supplied with air under pressure at predetermined intervals during the operating cycle of the apparatus. A reciprocating element 52 circular in general contour is connected at 53 adjacent its center to the piston rod 54 of the air cylinder 50. The table 48 is apertured at spaced positions and provided with bushings 55 to receive guide rods 56 fixed to the reciprocating element 52. The element 52 has three apertures 60 at the unloading position and at each rest position upon each side thereof so that during reciprocation of the element 52 it will not reciprocate the gripping units when at those positions. Adjustable screws 61 are supported by the reciprocating element 52 to actuate the gripping units at the loading position and at both of the coating positions, the screws 61 engaging the projections 45 of each gripping unit when disposed in alignment therewith.

Although the reciprocating element 52 will not operate the gripping unit through downward movement of the unit at the unloading position, the movable jaws of the gripping unit will be opened at this position to cause the coated articles to drop into the holder therebeneath. This is accomplished by a bracket 65 mounted on the reciprocating element 52 supporting a T-shaped member 66 which carries an adjustable bar 67 to engage the movable jaws 38 to move them simultaneously into the open position as shown at the right of Fig. 2.

The supports for the holders at the loading and unloading positions are identical in structure, they include members 70 with downwardly extending legs 71 straddling supporting blocks 72 which are mounted on the base 25. Pivots 73 permit movement of the members 70 into either the solid line position or the dotted line position shown in Fig. 3. Companion members 76 secured to the members 70 have longitudinal recesses 77 cooperating with similar recesses 78 in the members 70 to receive the holders 15. The holders are provided with pins 80 receivable in notches 81 of the members 70 to accurately position the holders to align the articles with their respective gripping elements. Handles 83 secured to the members 76 permit easy operation of the supports by the operator. Cam-like projections 85 of the members 70 have tapered surfaces 86 to be engaged by the double tapered upper ends 87 of spring pressed plungers 88 mounted in the blocks 72. The plungers 88 when engaging the bottom surfaces 89 of the projections 85 or the tapered surfaces 86 thereof, as shown in Fig. 5, will hold the supports respectively in the dotted line loading positions and the solid line feeding positions (Fig. 3).

Considering now the operation of the apparatus, let it be assumed that holders 15 filled with articles to be coated are supplied successively to the support 70 at the loading position and that empty trays or holders 15 are supplied successively to the support 70 at the unloading position. A flux bath 90 and a solder bath 91 are mounted on the base 25, these baths being supplied with their materials at given levels and a conventional heating means (not shown) maintaining the solder at a liquid state. During operation of the apparatus, beginning with the position shown in Fig. 1, the gripping unit 28 at the lower portion of this figure is at the loading position. While at this position, the air cylinder 50 will be operated, forcing the gripping unit downwardly by the screws 61 of the reciprocating element 52 engaging the portion 45 and compressing the springs 33 so that all of the articles in the holder at the loading position will be gripped simultaneously and held uniformly by this unit throughout the different steps of the operating cycle. When the reciprocating element is moved upwardly, the articles are removed from the holder after which they will be moved into alignment with the flux bath 90. While at rest in this position, the gripping unit will be lowered and raised, dipping the articles into the flux bath. The same operation takes place in the next position when the articles are dipped into the solder bath. The articles are allowed two steps in the intermittent movement of the turret before reaching the unloading position during which time the solder will solidify and the articles become cooled sufficiently so that they may be dropped into the holder at the unloading position. While in this position during the next reciprocal movement of the element 52 through operation of the air cylinder 15, the movable gripping jaws will be moved into open position through engagement of the bar 67, dropping the articles into their individual recesses of the holder at the unloading position. The empty gripping unit 28 then travels to the loading position after an intermediate idler position of the turret where it begins a new cycle. With three gripping units at equally spaced positions on the turret, the coating operation may be performed on many articles in rapid succession, the apparatus requiring only the supplying of a loaded holder at the loading position and an empty holder at the unloading position during each operating cycle.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for coating articles with solder comprising an intermittently movable turret, a loading position, a receptacle for a flux bath, a receptacle for a solder bath, and an unloading position; said loading and unloading positions and said receptacles constituting rest intervals of the turret, a gripping unit, including jaws normally closed by spring pressure, means to support the unit for reciprocation on the turret, means normally urging the unit upwardly, means to support an article at the loading position to be gripped by the unit, and means operated during the rest intervals of the turret to successively move the unit to grip the article, to dip it into the flux bath, then the solder bath and finally open the unit to free the article.

2. An apparatus for coating articles comprising a base, a carrier supported by the base for rotatable movement intermittently through operating cycles including intervals of rest relative to a loading position, a coating position and an unloading position, a receptacle for a coating material disposed at the coating position, gripping units mounted at spaced positions on the carrier and having relatively movable jaws with spring means to normally urge them into closed positions, like holders for articles, like supports for removably receiving the holders, rockable mountings for the supports on the base adjacent the loading and unloading positions for successive feeding of holders with articles to be coated to the support at the loading position, the feeding of empty holders successively to the support at the unloading position to receive the coated articles and for aligning the supports and holders with the gripping units at the loading and unloading positions, and means to actuate the gripping units to cause them to remove articles successively from the holders at the loading position, dip them into the material at the coating position and release the coated articles at the unloading position whereby they will drop successively into the holders at the unloading position.

References Cited in the file of this patent

UNITED STATES PATENTS

| Number | Name | Date |
|---|---|---|
| 706,408 | Hammond et al. | Aug. 5, 1902 |
| 928,172 | Bernardin | July 13, 1909 |
| 1,056,291 | Nazel | Mar. 18, 1913 |
| 1,708,429 | Mueller | Apr. 9, 1929 |
| 1,808,689 | Stenhouse et al. | June 2, 1931 |
| 1,873,209 | MacDonald | Aug. 23, 1932 |
| 1,958,846 | Christensen | May 15, 1934 |
| 2,206,778 | Kronquest | July 2, 1940 |
| 2,272,586 | Ross | Feb. 10, 1942 |
| 2,341,198 | Weiskopf | Feb. 8, 1944 |
| 2,556,382 | Williams | June 12, 1951 |